Aug. 9, 1949.   H. P. SERIO   2,478,784
DETACHABLE HANDLE
Filed Feb. 24, 1945
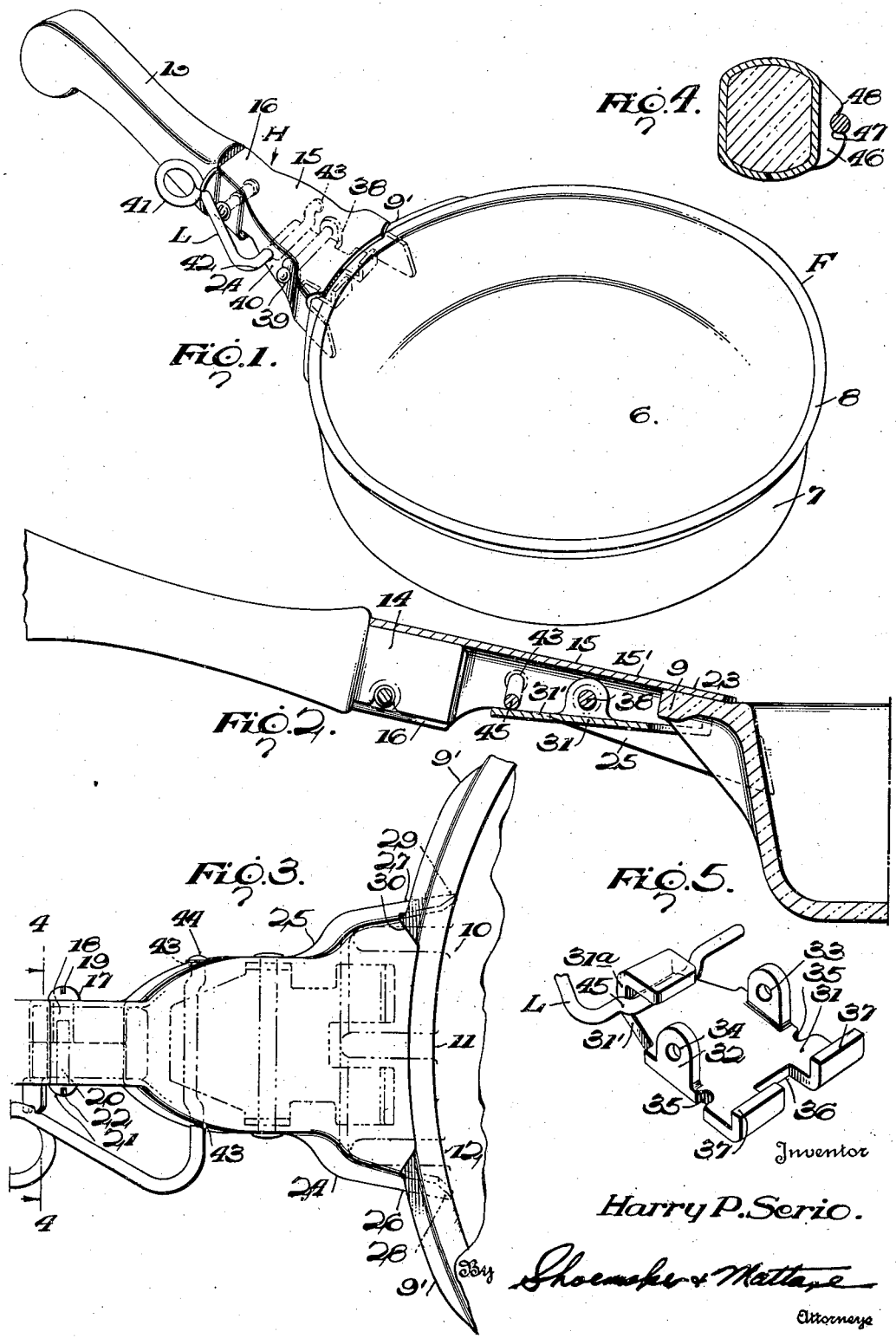
Inventor
Harry P. Serio.
By Shoemaker & Mattare
Attorneys Patented Aug. 9, 1949

2,478,784

UNITED STATES PATENT OFFICE 2,478,784

DETACHABLE HANDLE

Harry P. Serio, Elmira, N. Y.

Application February 24, 1945, Serial No. 579,523

4 Claims. (Cl. 294—31)

This invention relates to detachable handles.

The handles are particularly the type that are adapted to be used in connection with frying pans or other kitchen utensils.

My detachable handle is one that is particularly adaptable for connection with a glass "Pyrex" frying pan which is a standard article of manufacture now on the market. These glass frying pans are relatively shallow and are provided with the usual upstanding flange and an outwardly projecting attaching means for a detachable handle to be associated or connected therewith. The fact that the projection to which a detachable handle is attached is of glass presents several problems as regards the detachable handles now on the market. One of these problems is that the detachable handle, once it is associated with the glass frying pan, must be fool-proof to the extent that it will not accidentally or unintentionally be disconnected from the frying pan because this would be serious in that the hot contents of the pan, including hot grease, food, etc., may burn or scald the cook. Then, too, another problem is the fact that the projection to which the handle is to be attached, being of glass, requires a rather precision attachment of the handle to the pan and the jaws or other gripping means that grip the projection must be such that it will not bite into or abrade this glass projection for if it does it will act as a glass cutter and the projection will either break off or be cut off from the body of the glass frying pan or the like.

In my invention the detachable handle is such that when it is once connected or associated with the glass frying pan it can not possibly be unintentionally or accidentally disconnected from the pan for a definite mechanical movement is required in order that this handle be disconnected or disassociated from the pan. Then, too, the inherent structural characteristics of my handle are such that the biting into or scoring of the projection attachment for the handle is negative in that only so much pressure can be exerted on the clamping means which grips the integral projections of these glass frying pans and prevents any cutting, scoring or abrading of the glass projections. This results in the fact that my handle may be intentionally connected and disconnected from various utensils, preferably kitchen utensils, many times without fear of cutting or breaking off the integral glass attaching projections which are provided on such articles as frying pans and other cooking utensils or similar containers.

With the foregoing in mind, it is an object of my invention to provide a detachable handle possessing such inherent structural characteristics so that once being attached it can not be accidentally or unintentionally disassociated from the article such as a frying pan to which it has been attached.

Another object of my invention is to provide a detachable handle of relatively simple and inexpensive construction, yet being capable of long, continuous and effective use and consisting of a minimum number of parts.

Another object of my invention is to provide a detachable handle for a cooking utensil whereby glass cooking and frying utensils may be clasped and held by the same without in any way affecting the glass projection such as cutting or breaking the latter away from the utensil.

Another object of my invention is to provide a detachable handle consisting of a minimum number of metallic parts and an ornamental grasping portion which may be of plastic material and suitably colored, if desired.

Another object of my invention is to provide a novel locking mechanism for the movable jaw of a detachable handle so that when the handle is attached to a utensil and locked any possibility of accidental or unintentional disconnection or removal of the handle from the utensil is positively prevented.

With these and other objects in view, the invention consists in the construction and novel combination and arrangement of parts hereinafter fully described, illustrated in the accompanying drawings and pointed out in the claims hereto appended, it being understood that various changes in the form, proportion, and minor details of construction within the scope of the claims may be resorted to without departing from the spirit or sacrificing the advantages of the invention.

In the drawings:

Fig. 1 is a perspective view showing a conventional glass frying pan with my detachable handle fixedly associated with and clamped and locked thereto;

Fig. 2 is a fragmentary view partly in vertical section showing my detachable handle in locking engagement with the projection of a conventional glass frying pan;

Fig. 3 is a fragmentary top plan view of my detachable handle in its associated and locked position with regard to the glass utensil;

Fig. 4 is a transverse sectional view taken on the line 4—4 of Fig. 3; and

Fig. 5 is a modification of one of the clamping jaws of my detachable handle.

Like reference numerals in the several figures of the drawings all denote the same parts.

The invention will be more readily understood by referring to the following detailed description of the drawings:

A conventional frying pan or other cooking utensil is denoted generally at F. This utensil is fabricated of glass and consists of a bottom 6 and an integral upstanding circular inclined wall 7 having a beaded or rounded top edge 8. An integral extension or projection 9 extends radially outwardly from one side edge portion of the receptacle F and is disposed at substantially right angles to the upstanding circular wall 7. Below this projection 9 three reinforcing or strengthening webs 10, 11 and 12 extend and are integral with the respective outer sidewall portions of the circular upstanding wall 7. This construction provides for rather rigid projection 9 which is braced by the webs 10, 11 and 12. It is this projection 9 and a further outwardly extending flange or bead 9' that affords connection therewith of a detachable handle or other gripping means so that the frying pan or the like can be used in the ordinary sense in carrying out the frying or cooking operation, whatever it may be.

My detachable handle, denoted generally at H, consists of a hand gripping portion 13 of any desired exterior contour and which may be made of any material but preferably is made of one or more of the modern plastics of the non-heat conducting type. This plastic handle hand gripping portion 13 may be of transparent material, plastic material, or the material may have incorporated therein a suitable pigment to render the same translucent or opaque in any desired color or shades of colors or pastels.

The hand gripping portion 13 is preferably reduced in cross section at its inner end 14 and this reduction and projection is preferably polygonal in outline. An upper clamping jaw 15 which is preferably fabricated of metal and fashioned into a socket formation 16 at one end thereof receives in said socket portion the reduced polygonal portion 14 of the hand gripping element 13 and is held in fixed association therewith by means of a fastener, denoted generally at 17. This fastener 17 consists of a hollow interiorly threaded, elongated nut 18 provided with a groove 19 therein for reception of a screw driver or the like and a complementary exteriorly threaded bolt 20 having a head 21 with a screw driver groove 22 therein and the threads of which engage within the interiorly screw threaded nut 17, see Fig. 3. This socket end formation 16 of the upper jaw 17 provides for a secure and effective attachment of the handle grip portion 13 with the gripping jaw 15 and one that will not accidentally become disconnected or disassociated.

The upper gripping jaw 15 consists of a flat top portion 15' which is fashioned into the socketed end 16. This top portion 15' tapers from the socket end to the other end whereat a substantial portion 23 thereof engages and overlies the upper part of the projection 9 of the glass receptacle. The tapering top portion of the upper clamp 15 is provided with integral oppositely disposed sidewalls 24 and 25 which are in the form of flanges. The ends of the flanges 24 and 25 are in the form of forwardly extending ears 26 and 27 respectively. These ears each have their extreme forward ends 28 and 29 inclined in the same plane as the upstanding circular wall 7 of the receptacle or utensil and with the forward portion 23 of the top 15 of the upper clamp provide cut-outs 30 into which extend the integral flange 9' of the glass utensil, see Figs. 1 and 3.

The lower jaw of the detachable handle consists of a substantially flat plate 31 preferably of metal and of generally tapering formation from its rear end to its front end. This lower jaw is provided intermediate of its ends with upstanding lugs 32 and 33, each provided with an opening 34 therein. Adjacent the lugs the lower jaw is oppositely cut out as at 35 and forwardly of which the extreme front end thereof is similarly cut out as at 36 and the ends 37 constituting the clamping and gripping means are bent at a right angle to the clamping plate 31 and as seen in Figs. 2 and 5, these clamping elements are substantially vertically disposed with respect to the lower clamping jaw. A suitable pin 38 is passed through oppositely aligned openings 39 in the flanges 24 and 25 of the upper jaw, and this pin also passes through the aligned openings 34 in the upstanding lugs 32 and 33 of the lower jaw and the opposite ends of the pin are headed or upset as at 40 which provides for permanent pivotal connection of the two jaws 15 and 31.

The locking and operating means for the detachable handle is indicated generally at L. This locking and operating means is preferably formed of stout wire or the like and is generally L-shaped and consists of a finger piece 41 and a right angle extension thereof 42, the latter of which passes through aligned openings 43 in the oppositely disposed flanges 24 and 25 and is held therein by upsetting or heading the end 44 exteriorly of the flange 25, see Fig. 3. The portion 42 of the locking and operating means L for the lower jaw is in the form of a cam 45, see Fig. 2. The cam is of a rather elongated form and is adapted for engagement with the tapered end portion 31' of the lower jaw 31 so that when the finger piece is rotated the cam portion 45 thereof engages the rear portion 31' and rocks the lower clamping jaw 31 on the pivot pin 38 and effects a gripping of the upstanding gripping jaws 37 with the under side of the projection 9 of the utensil, see Figs. 1, 2 and 3.

The means for locking the finger piece and jaw operating means in place consists of a right angle projecting flange 46 which is preferably integral with and turned at a right angle from the extreme inner end portion of the socket 16. This locking flange 46 is provided with a recess 47 and a cammed surface 48 so that when the finger piece rides over the cammed surface 48 and possessing inherent flexible characteristics, this finger piece will snap into the recess 47 and will be maintained in that locked and secure position against unintentional or accidental displacement therefrom. Of course the locking flange 46 might well be a separate element and welded or otherwise attached to the socketed end 16 of the detachable handle but it is preferable to form this locking flange integral with the socket member and turn it outwardly at a right angle thereto.

The modification of the invention in Fig. 5 differs from the lower clamping jaw, shown in Figs. 1, 2 and 3, in that the inner end thereof 31' is reversely bent into substantially U-shaped formation 31a. This results in the formation of a slot or groove 31b for the cam 45 of the locking and operating lever L. In other words, using the clamping jaw of Fig. 5 instead of that shown in Figs. 1, 2 and 3, the cam part 45 of the locking and operating lever will at all times be disposed and maintained in the groove 31b, whether or not the handle is in the locked or unlocked position.

In some instances, particularly where the projection 9 is not provided with the central brace or web 11, it is desirable to eliminate the cut-out 36 in the lower jaw 31. When this is done the upstanding gripping means 37 is, therefore, continuous from one side edge of the jaw to the other.

From the foregoing it is believed quite clear that I have provided a detachable handle for cooking utensils and the like which when once attached to the utensil will not become accidentally or unintentionally disengaged or disconnected therefrom and this handle with its particular gripping mechanism will not result in biting into or abrading the clamped glass surface of the cooking utensil. It will further be seen that by a simple manual application the upper jaw 15 can be readily disposed over the projection 9 of the glass container and that the gripping means 37 of the lower jaw 31 will automatically be positioned beneath the glass projection 9. Then by simply flipping the locking and operating means L with the finger the same will cause the cam 45 to operate the lower clamping jaw 31 to grip the projection 9 and can be snapped into locked position whereby the handle is securely fixed to the utensil, and is held there resiliently so to speak. Then by a simple movement and flexing of this locking means the same can be intentionally, and intentionally only, disassociated from the locking means and the handle removed from the utensil. It will be seen that when the lower clamping jaw 31 is engaged with the projection 9 the intermediate web or brace 11 will project into the opening 36 at the forward end of this jaw and that the two upstanding gripping members 37 will firmly and effectively, due to the camming action of the operating lever, grip the underside of the projection 9 of the utensil and be held in such gripping relation under tension due to the resilient and flexible characteristics of the operating and locking means L. This locking and operating means L being of wire, and when in locked position, places the two jaws 15 and 31 under tension and prevents an excess pressure being applied so that a cutting of the glass projection 9 will not result, yet a very effective and firm connection is provided.

I claim:

1. A detachable handle of the character described, including a hand gripping portion and a fixed gripping jaw connected therewith, the fixed jaw including depending spaced flanges at opposite sides thereof, a movable gripping jaw, said movable gripping jaw being pivotally connected with the spaced flanges of the fixed jaw, a cam locking and operating means for the movable jaw, said cam and operating means consisting of a wire, including a cam portion adapted for engagement with the movable jaw between the spaced flanges and an integral portion therewith extending outwardly from one of the spaced flanges in the form of a finger piece for operating the cam and a cam locking mechanism carried by the fixed jaw, including a recess into which said finger piece snaps to lock the jaws.

2. A detachable handle, including a fixed jaw and a movable jaw, the latter being pivotally connected to the former, one end of the fixed jaw being in the form of an open end socket to receive a hand gripping portion therein, an integral outstanding locking means projecting from the open end of the socket, cam operating means for the pivotal jaw adapted for engagement with the same and having integral therewith a finger piece which is adapted when in clamping position to place the said jaws under tension and to be locked by said integral locking means carried by the socketed end of the fixed jaw.

3. A detachable handle of the character described, including a hand gripping portion and a fixed gripping jaw connected therewith, the fixed jaw including depending spaced flanges at opposite sides thereof, a movable gripping jaw having gripping means at one end thereof and of substantially U-shaped formation at its other end, said movable gripping jaw being pivotally connected with the spaced flanges of the fixed jaw, a cam locking and operating means for the movable jaw, said cam and operating means consisting of a wire, including a cam portion adapted for engagement with and operation in the U-shaped formation of the movable jaw between the spaced flanges and an integral portion therewith extending outwardly from one of the spaced flanges in the form of a finger piece for operating the cam and for engagement with locking mechanism carried by the fixed jaw.

4. A detachable handle of the character described including a hand gripping portion and a fixed jaw connected thereto, the fixed jaw having a closed top portion with integral depending spaced flanges at opposite sides thereof, the said flanges each having forwardly extending ears for engagement with a utensil, a movable gripping jaw, the movable jaw having a substantial utensil gripping portion and being pivotally mounted between the flanges on a pin, the pin being secured at each end to and extending between the flanges, a cam means for operating the movable jaw, the said cam means also being pivotally mounted between the said flanges, and means integral with the cam means and extending laterally beyond one of the flanges for operating the cam means.

HARRY P. SERIO.

REFERENCES CITED

The following references are of record in the file of this patent:

UNITED STATES PATENTS

| Number | Name | Date |
|--------|------|------|
| 606,904 | Tubbs | July 5, 1898 |
| 2,077,273 | Serio | Apr. 13, 1937 |
| 2,151,276 | Mattoon | Mar. 21, 1939 |
| 2,162,961 | Mattoon | June 20, 1939 |
| 2,362,720 | Richart | Nov. 14, 1944 |